US012636985B2

(12) United States Patent
Reiss, Jr.

(10) Patent No.: US 12,636,985 B2
(45) Date of Patent: May 26, 2026

(54) SEAT AND SEAT BACK FOR MULTI-PASSENGER VEHICLE

(71) Applicant: Thomas J. Reiss, Jr., Ixonia, WI (US)

(72) Inventor: Thomas J. Reiss, Jr., Ixonia, WI (US)

(73) Assignee: Reiss International, Ltd., Watertown, WI (US)

(*) Notice: Subject to any disclaimer, the term of this patent is extended or adjusted under 35 U.S.C. 154(b) by 635 days.

(21) Appl. No.: 18/091,741

(22) Filed: Dec. 30, 2022

(65) Prior Publication Data

US 2024/0217405 A1 Jul. 4, 2024

(51) Int. Cl.
| | |
|---|---|
| *B60N 2/42* | (2006.01) |
| *B60N 2/24* | (2006.01) |
| *B60N 2/58* | (2006.01) |
| *B60N 2/64* | (2006.01) |

(52) U.S. Cl.
CPC .............. *B60N 2/42* (2013.01); *B60N 2/242* (2013.01); *B60N 2/58* (2013.01); *B60N 2/64* (2013.01)

(58) Field of Classification Search
CPC . B60N 2/42; B60N 2/242; B60N 2/58; B60N 2/64
See application file for complete search history.

(56) References Cited

U.S. PATENT DOCUMENTS

| | | | |
|---|---|---|---|
| 3,827,752 A | 8/1974 | Bissinger, Sr. | |
| 4,109,959 A | 8/1978 | Barecki et al. | |
| 4,307,200 A | 12/1981 | Lichter et al. | |
| 5,542,747 A * | 8/1996 | Burchi | B60N 2/4263 297/DIG. 2 |
| 5,609,395 A | 3/1997 | Burch | |
| 6,420,448 B1 | 7/2002 | Hnatow et al. | |
| 7,611,197 B2 | 11/2009 | Mattes et al. | |
| 8,172,320 B2 | 5/2012 | Kalinowski | |
| 8,647,544 B2 | 2/2014 | Burch | |
| 8,696,067 B2 * | 4/2014 | Galbreath | 297/452.1 |
| 10,208,187 B2 | 2/2019 | Piotrowski et al. | |
| 2002/0185905 A1 * | 12/2002 | Cassinelli | B64D 11/06 297/440.22 |
| 2005/0189802 A1 | 9/2005 | Mattes et al. | |

FOREIGN PATENT DOCUMENTS

| | | |
|---|---|---|
| CN | 112334359 A | 2/2021 |

OTHER PUBLICATIONS

"EPS Insulation" (Information Bulletin), *Plymouth Foam*, 1 page. URL: https://goplymouthfoam.com/resources/EPS/PF--Spec-Sheet-copy.pdf ; website known prior to Dec. 30, 2022.
"Material Physical Property Information for ARPLANK® Products, ARPAK® Expanded Polyethylene (EPE)—Density Range 1.3 pcf to 4.6 pcf (20 to 74 g/l)" (Physical Property Sheet), *ARPLANK Direct*, 1 page. URL: https://arplankdirect.com/wp-content/uploads/2021/02/TechDataHome_PhysicalPropertyinformation_EPEproducts.pdf; website known prior to Dec. 30, 2022.

* cited by examiner

*Primary Examiner* — Anthony D Barfield
(74) *Attorney, Agent, or Firm* — Reinhart Boerner Van Deuren P.C.

(57) ABSTRACT

A seat for a multi-passenger vehicle. The seat includes a seat cushion mounted on a frame of the seat, a back cushion mounted to the frame, and a seat back mounted on an opposite side of the frame. The back cushion and the seat back extend transversely away from the seat cushion. The seat back includes a head impact portion and a leg impact portion. The leg impact portion includes expanded polyethylene (EPE) foam having a second density between 1.0 and 1.6 pcf.

19 Claims, 12 Drawing Sheets

SEAT AND SEAT BACK FOR MULTI-PASSENGER VEHICLE

FIELD OF THE INVENTION

This invention generally relates to multi-passenger vehicle seats and their seat backs, and more particularly to multi-passenger vehicle bus seats and their seat backs.

BACKGROUND OF THE INVENTION

Multi-passenger vehicles include, for example, busses, coach busses, school busses, recreational vehicles, boats, ships, trains, and aircraft. Typically, multi-passenger vehicles have mounted therein passenger and driver seats. The seats are manufactured to comply with various federal and state safety standards. It will be readily apparent that the invention is applicable to seats that may be either passenger or driver seats for multi-passenger vehicles. Therefore, while the background and disclosure below discuss bus passenger seats and their safety requirements it is not the intent to limit the invention only to bus passenger seats.

School bus passenger seats are manufactured to comply with various Federal Motor Vehicle Safety Standards including those set forth in 9 CFR § 571.302—Standard No. 302; Flammability of interior materials (FMVSS 302). The purpose of FMVSS 302 as recited therein is to, "reduce the deaths and injuries to motor vehicle occupants caused by vehicle fires, especially those originating in the interior of the vehicle from sources such as cigarettes."

Additionally, school bus passenger seats must be compliant with 49 CFR § 571.22—Standard No. 222; School bus passenger seating and crash protection (FMVSS 222). The purpose of the FMVSS 222 safety standard as recited therein is to, "reduce the number of deaths and the severity of injuries that result from the impact of school bus occupants against structures within the vehicle during crashes and sudden driving structures." This purpose is addressed in the safety standard by setting forth requirements that the seat including their seat backs, must meet, among other requirements, size, loading, energy, absorption and deflection requirements. FMVSS 222 also defines various terms of art incorporated as if fully set forth herein, for example a school bus passenger seat is defined therein as a seat in a school bus, other than a driver's seat.

Multi-passenger vehicle seats have a frame which receives a seat cushion, a back cushion and a seat back. A vertical portion of the frame therefore is sandwiched between the back cushion and the seat back. The seat cushion is understood to mean a horizontally extending portion of the seat that contacts the passenger's thighs and buttocks as they seat themselves in the seat. The back cushion is understood to mean a vertically extending portion of the seat that contacts the passenger's spine as they are seated in the seat. The seat back is understood to mean a vertically extending portion of the seat that is located on the side of the frame opposite that of the back cushion. In multi-passenger vehicles with seats arranged facing a front of the vehicle, a passenger is usually seated in one seat while they face the seat back of the seat in front of them.

Typically, seat backs for bus passenger seats meet the various safety requirements by constructing the seat backs with a material such as foam, an attenuating, energy absorbing, material that acts as a passive restraint. The passive restraint is a generally understood as a passenger crash protection provided by a protective envelope consisting of strong, closely-spaced seats that have these energy-absorbing seat backs. In the event of an accident, the seat back material absorbs the impact of a passenger who might be thrown forward into the seat back and thereby lessen or prevent injury to the passenger.

Seat back safety is typically degraded and no longer complies with the safety requirements where the bus has been in an accident resulting in a passenger or object has impacted the seat back. However, accidents are not the only means by which the seat back safety can be degraded below compliance with FMVSS 222. During regular, day to day use in the field, any number of forces act on the seat back to degrade its properties such that the seat and its seat back no longer complies with FMVSS 222 even though the bus has never been in an accident. For example, the seat back may be kicked by passengers or subject to other forces during horseplay or impacted by items such as book bags. These forces may compress, break, puncture, tear, rip, or crack the material making up the seat back. After experiencing this wear and tear, the seat back may no longer meet the safety requirements of FMVSS 222. When the seat backs are no longer compliant with FMVSS 222 they must be repaired or replaced which drives up the cost of maintaining the bus and its passenger seats.

Manufacturers producing seat backs that are compliant with FMVSS 222 may be interested in lowering manufacturing costs but not in producing seats that exceed the FMVSS 222 safety requirements and are compliant longer with FMVSS 222 with use in the field as such efforts would likely lead to the higher costs they seek to avoid. Indeed, while current seat backs comply with FMVSS 222 at the time of manufacture and installation, the wear of the seat backs from use in the field may not be of interest to manufacturers because they can already offer a solution that is accepted in the industry and by federal safety standards. For a seat that is not compliant with FMVSS 222, it can either be replaced or the seat back can be replaced with a new seat and seat back that is compliant.

In addition to the foregoing, in order for the foam of the seat backs to meet FMVSS 302, typically a flame retardant material is applied as a coating over the foam's outermost surface or a layer of material is inserted between the cover surrounding the foam and the foam of the seat back in order for the bus seat to meet FMVSS 302. This further coating and or additional layer of material of the seat back increases the cost of producing the vehicle because of the additional cost involved in purchasing the material and actually installing or applying it during the manufacturing process. Moreover, the risk to the health of passengers, particularly children on school bases may be increased due to exposure to further chemicals.

BRIEF SUMMARY OF THE INVENTION

Embodiments of the invention provide a seat and a seat back for the seat of a multi-passenger vehicle. As noted above, multi-passenger vehicles include, for example, busses, coach busses, school busses, recreational vehicles, boats and ships, trains, and aircraft. While school bus seats will be discussed in preferred embodiments, it is not the intent to limit the invention only to school bus passenger seats, nor to limit the invention to passenger seats, as driver seats may also benefit from the invention. The seat backs include polyurethane foam and expanded polyethylene (EPE) having physical properties that heretofore have not been used nor arranged as in the disclosed embodiments of the invention. In use, the seat and seat backs are compliant with FMVSS 222 and FMVSS 302 for longer periods of time than has been heretofore known. Moreover, while the seat and seat backs are safer, the increased safety provided by embodiments of the invention should be achieved without increased cost to the manufacturer.

The seats having the seat backs of the disclosed embodiments are compliant at manufacture with FMVSS 222 and 302, and once in use in the field, that is, after they have been installed in the school bus, based on the studies undertaken, it is believed they will have a greater longevity in compliance with those FMVSS standards than those currently in use. By greater longevity, it is meant the embodiments of the seats having seat backs of the instant invention, once installed and subject to the wear and tear during use, will remain compliant longer with FMVSS 222 longer than those in currently in use. Therefore, it is believed passengers seated in seats with the seat backs of the instant invention will be safer for longer than what current seats with seat backs provide.

Comparison studies that support the belief that the seats with the seat backs of the instant invention comply longer with FMVSS 222 will be presented in the Detailed Description. Moreover, the seat backs do not need to have their foams coated with a flame-retardant chemical or have a further layer applied over their outer surfaces to be compliant with FMVSS 302, thus resulting in a cost savings for manufactures who need not pay to apply or affix such a flame retardant layer to or over the outermost surfaces of the seat back. Further, because such fire retardant spray or layer is not necessary it is believed the seat backs are safer for passengers because the passengers are exposed to less chemicals.

In one aspect, the invention provides a seat for a multi-passenger vehicle. The seat includes a seat cushion mounted on a frame of the seat, a back cushion mounted to the frame, and a seat back mounted on an opposite side of the frame. The back cushion and the seat back extend transversely away from the seat cushion. The seat back includes a head impact portion and a leg impact portion. The leg impact portion includes expanded polyethylene (EPE) foam having a second density between 1.0 and 1.6 pcf.

In another aspect, the invention provides a seat back for a multi-passenger vehicle. The seat back includes a head impact portion and a leg impact portion. The head impact portion includes polyurethane foam having a first density between 3.1 and 3.7 pounds in a cubic foot (pcf) and an indentation force deflection (IFD) between 67 and 83 pounds at 25% compression.

In yet another aspect, the invention provides a method of manufacture of a seat for a multi-passenger vehicle. The method includes the steps of attaching a seat back to a seat frame. The seat back includes a head impact portion and a leg impact portion. The head impact portion comprises polyurethane foam having a first density between 3.1 and 3.7 pounds in a cubic foot (pcf) and an indentation force deflection (IFD) of between 67 and 83 pounds at 25% compression.

In an embodiment, the leg impact portion comprises expanded polyethylene (EPE) foam having a second density between 1.0 and 1.6 pcf.

In an embodiment, the first density is 3.4 pcf and the IFD is 75 pounds at 25% compression.

In an embodiment, the second density is 1.3 pcf.

In an embodiment, the multi-passenger vehicle is a bus and the seat is a passenger seat.

In an embodiment, the head impact portion is compliant with Federal Motor Vehicle Safety Standard Number 222 (FMVSS 222) for a contactable surface of a head protection zone.

In an embodiment, the leg impact portion is compliant with Federal Motor Vehicle Safety Standard Number 222 (FMVSS 222) as a leg protection zone.

In an embodiment, the head impact portion defines an impact body having a first face facing away from a second face, and a first thickness defined between the first face and the second face between 1⅝ and 2 inches.

In an embodiment, the leg impact portion defines a knee body having a third face facing away from a fourth face and a second thickness defined between the third face and the fourth face between 2 and 2.5 inches.

In an embodiment, the seat back includes a cover covering the head impact portion and the leg impact portion.

In an embodiment, the cover contacts the polyurethane foam of the head impact portion and the cover contacts an EPE foam of the leg impact portion.

In an embodiment, the polyurethane foam of the head impact portion and the EPE foam of the leg impact portion are flame retardant, compliant with FMVSS 302, and are free of any flame retardant coating over their outermost surfaces.

In an embodiment, the head impact portion includes polyurethane foam having a first density between 3.1 and 3.7 pounds in a cubic foot (pcf) and an indentation force deflection (IFD) of between 67 and 83 at 25% compression.

In an embodiment of the method, the method includes the step of covering the seat back with a cover, the cover in contact with the polyurethane foam of the head impact portion and in contact with an EPE foam of the leg impact portion.

In an embodiment the polyurethane foam of the head impact portion and the EPE foam of the leg impact portion are flame retardant, compliant with FMVSS 302, and are free of any flame retardant coating over their outermost surfaces.

In an embodiment, the head impact portion and the leg impact portions are compliant with Federal Motor Vehicle Safety Standard Number 222 (FMVSS 222) for a contactable surface of a head protection zone and a leg protection zone. The polyurethane foam of the head impact portion is compliant with FMVSS 302.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 10 photograph of EPE 1.3 pcf leg protection zone testing results;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
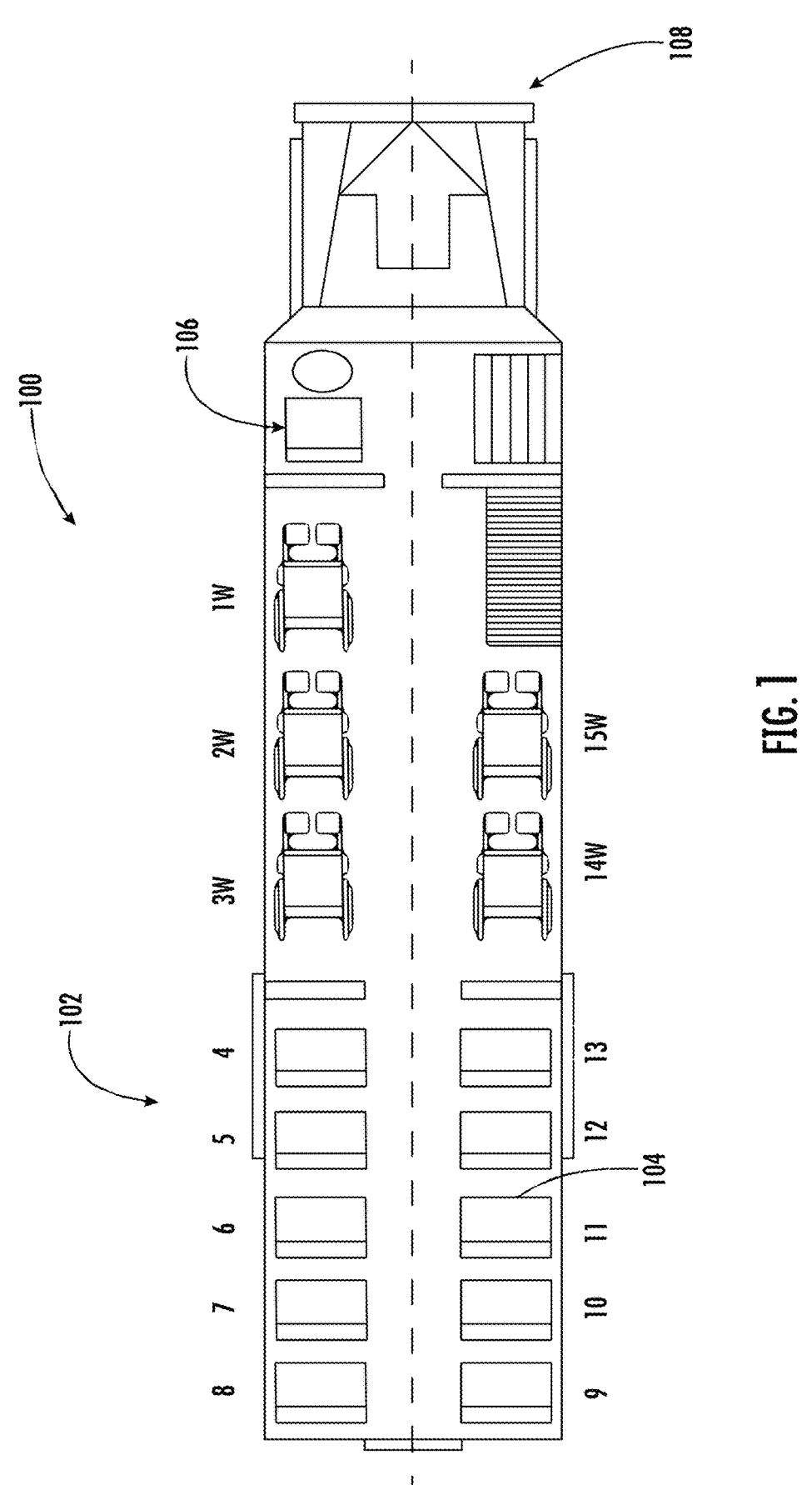
FIG. 1 is a bus seat floorplan.

Turning now to the drawings, there is illustrated in FIG. 1 a typical bus seat floorplan, that may be coach bus floorplan or a school bus 100 floorplan. As noted above, while school bus seats will be discussed in preferred embodiments, it is not the intent to limit the invention only to school bus passenger seats, nor to limit the invention to passenger seats.

The school bus 100 includes a seating configuration 102 having passenger seats 104 spaced from one another and spaced apart from a driver's seat 106 at a front 108 of the school bus 100. The passenger seats 104 may be bench seats or bucket seats. The seating configuration 102 may vary depending on the size of the school bus 100 and its permissible occupancy as well as a passenger seat width 104 of the bus seat 102 as set forth in FMVSS 222. Accordingly, both the seating configuration 102 and the passenger seat 104 dimensions may vary provided the final dimensions comply with FMVSS 222 and FMVSS 302.

Figures 2, 3:
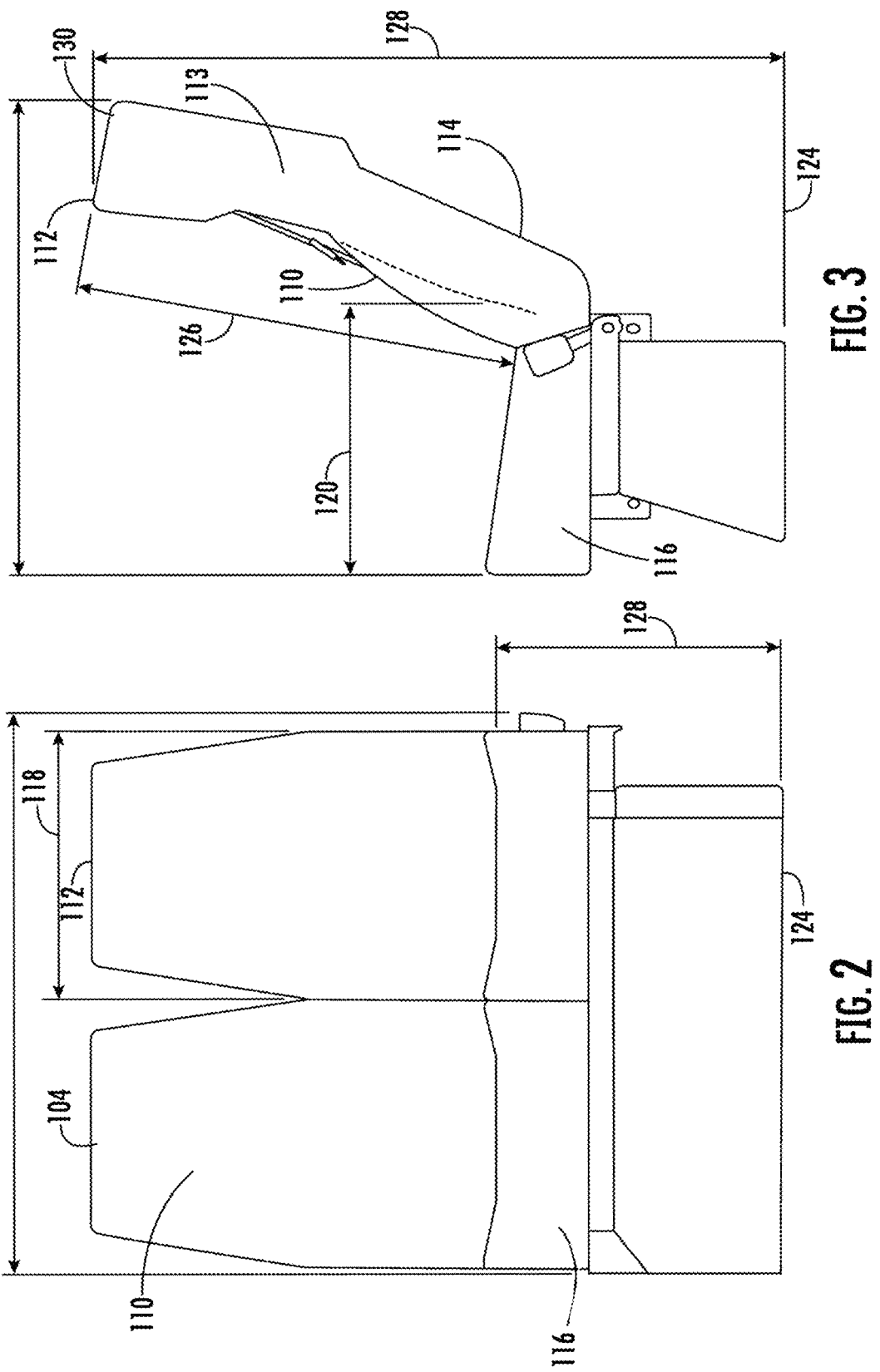
FIG. 2 is a schematic illustration of a front view of a bus seat assembly including a pair of passenger seats for the bus of FIG. 1.
FIG. 3 is a schematic illustration of a side view of one of the pair of passenger seats of FIG. 2.

FIG. 2 is an exemplary embodiment of the passenger seat 104 that is a bucket seat in side by side relationship with the bucket seat 112, also known as a coach seat, which is the same as passenger seat 104. FIG. 3 is a side view of one of the passenger seats 104, 112. The passenger seats 104, 112 may be referred to as a passenger seat assembly. Each of the passenger seats 104, 112, have a seat back 114 that is covered with a cover 113. The cover 113 that may be comprised of any known materials in the art, provided the seats 104, 112 remain compliant with the applicable regulatory provisions such as FMVSS 222 and FMVSS 302. While such an exemplary passenger seat 104 embodiment will be utilized in describing various features and advantages of embodiments of the invention, such a description should be taken by way of example and not by limitation. Indeed, advantages of embodiments of the invention can be used to replace or repair existing multi-passenger vehicle seats and seat backs where it is desirable to retrofit the seats for compliance with FMVSS 222 and FMVSS 302 such that the seats are fully compliant with these provisions over longer periods of time than what is currently available.

Moreover, it is not the intent of the instant invention to limit use to a passenger seat 104 with its seat back 114 to a passenger seat for a school bus. Indeed, the bus passenger seat 104 described herein and the seat backs 114 while having dimensions and properties compliant with FMVSS 222 and 302 might also be compliant with various safety provisions and regulations for other multi-passenger vehicles. By way of non-limiting example, the passenger seat 104 may be useable in aircraft, boats, ships, recreational vehicles (RV's), or trains or as driver's seats, provided there use therein is compliant with the relative regulatory requirements.

With respect then to FIG. 2 and FIG. 3, the passenger seat 104 includes the back cushion 110 on forward facing part of a frame 132 (FIG. 4), a seat back 114 on a reward facing part of the frame 132 (FIG. 4), and a seat cushion 116 extending transversely from the seat back 114 and back cushion 110. By forward it is meant facing the front 108 (FIG. 1) when installed. By rearward it is meant facing the opposite direction of the front 108 (FIG. 1).

The passenger seats 104, 112 each have a seat cushion width 118 that is 17½ inches and a seat cushion length 120 of 17½ inches. A seat cushion height 122 is 18½ inches above a floor 124 of a vehicle, for example the bus 100 (FIG. 1). A seat back length 126 is 28¾ inches. A seat back height 128 measured from the floor 124 to a top 130 of the seat back 102 is 44¾ inches. The total seat length 118 is 30¾ inches. While such dimensions are provided, they are given merely as an example as other dimensions can be manufactured provided they comply with the size and properties set forth in FMVSS 222.

Figure 4:
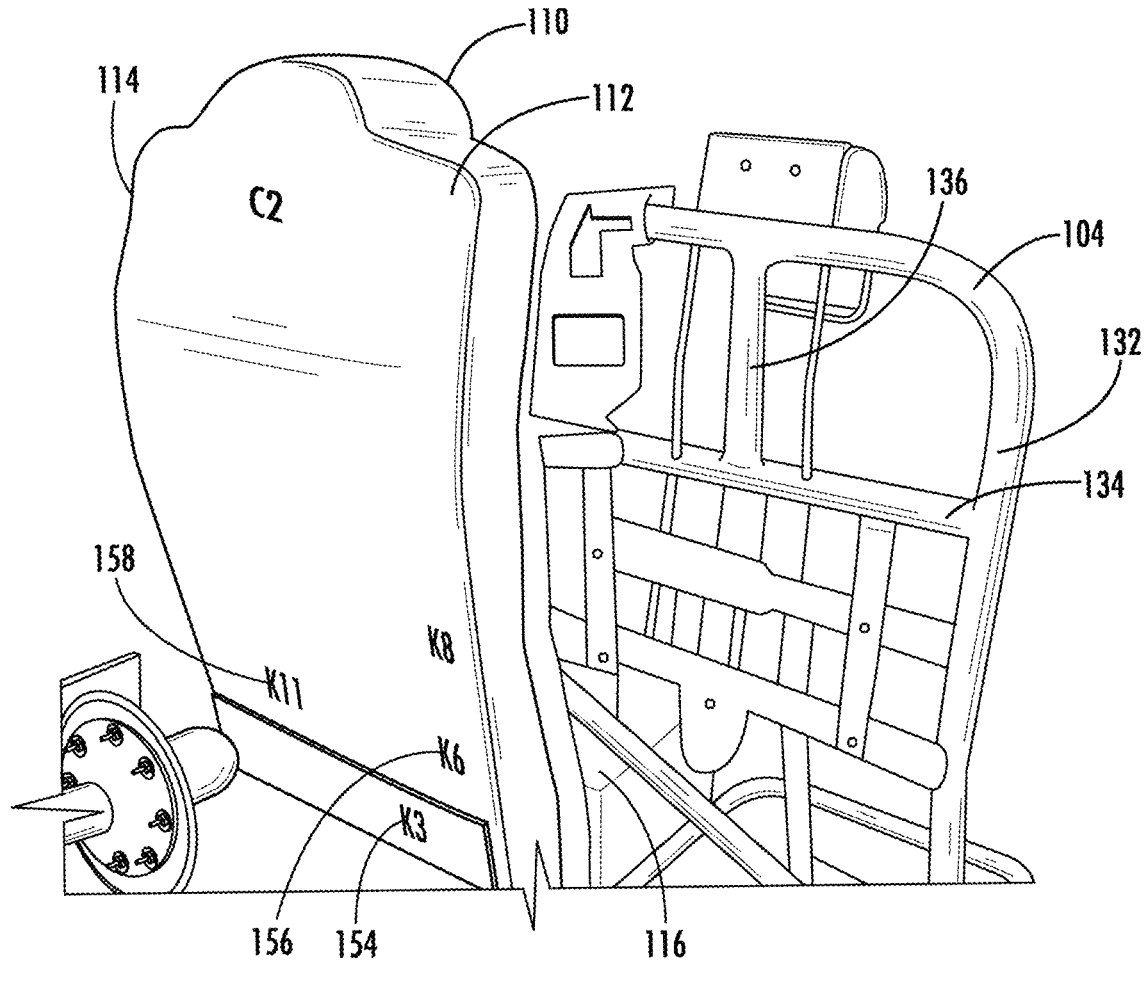
FIG. 4 illustrates a back view of the passenger seats of FIG. 2, with a seat cushion and seat back of one of the passenger seats removed to show a frame of the passenger seat.
Figure 5:
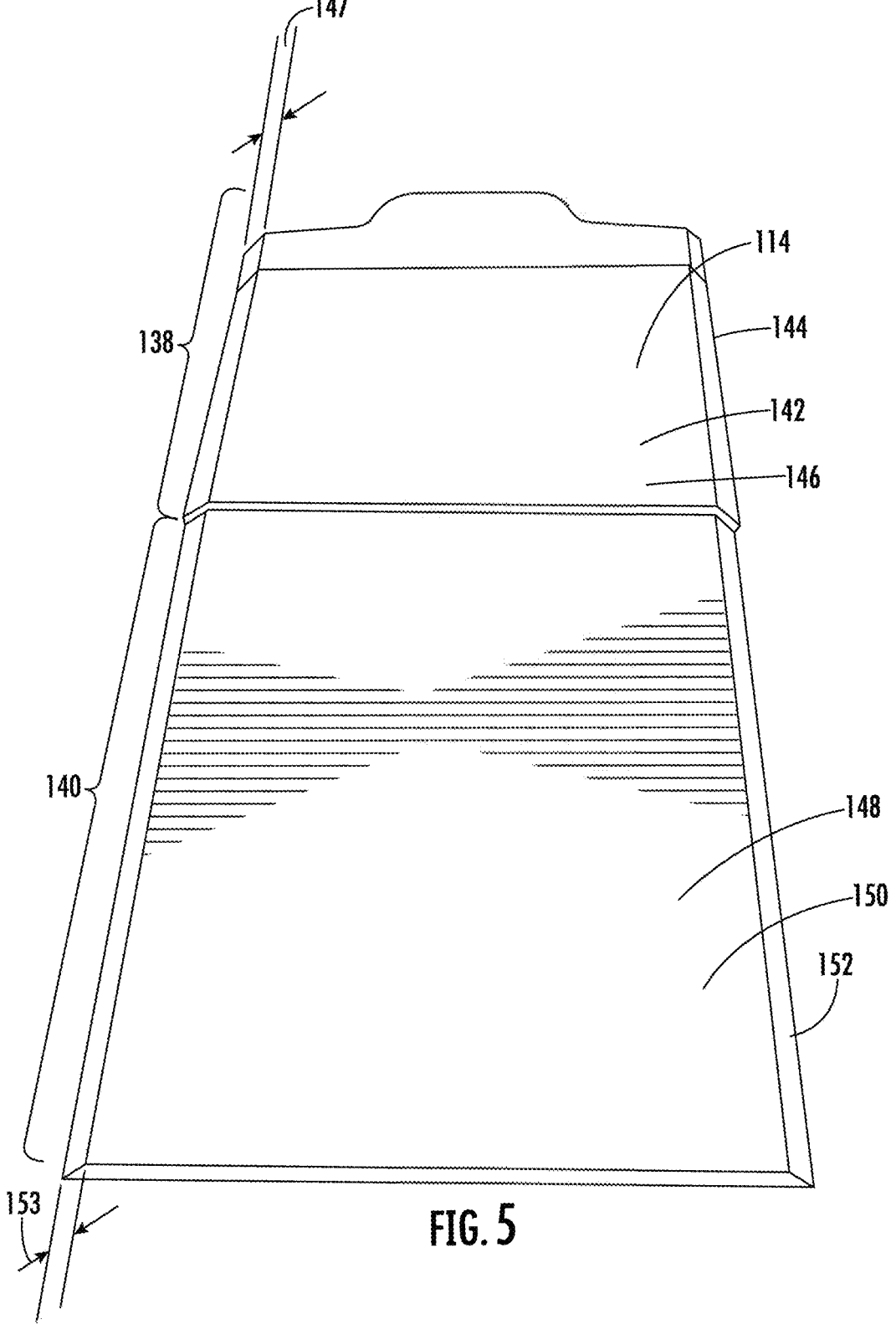
FIG. 5 illustrates a seat back of one of the pair of passenger seats of FIG. 2 with a cover for the seat back removed.

FIG. 4 illustrates a back view of the passenger seats 104 and 112 of FIG. 2. The passenger seat 104 has had the seat back 114, the back cushion 110, and seat cushion 116 removed to better illustrate an exemplary embodiment of the frame 132 of the passenger seat 104. The same frame 132 is present in the passenger seat 112. The frame 132 may be made up of any number of materials, for example metal, composite, or combinations thereof. The frame 132 may have cross members 134 and transverse members 136 to provide bearing surfaces to support and or mount the seat back 114 and the cushion 116. FIG. 5 illustrates the seat back 114 with the cover 113 removed to better illustrate the materials making up the seat back 114.

With respect to FIG. 4 and FIG. 5, the passenger seat 104 includes the seat cushion 116 and the seat back 114. The seat back 114 extends transversely from the seat cushion 116. The seat cushion 116, the back cushion 110, and seat back 114 are attached to the frame 132. The attachment means are well understood in the art, e.g. fasteners or bonding or sliding over the frame 132 or various combination thereof so long as the passenger seat 104 remains compliant with FMVSS 222 and 302. The seat back 114 includes a head impact portion 138 and a leg impact portion 140.

The head impact portion 138 is made up of polyurethane foam having a density between 3.1 and 3.7 pounds in a cubic foot (pcf) and an indentation force deflection (IFD) between 67 and 83 pounds at 25% compression. In a preferred embodiment the density is 3.4 pcf for the polyurethane foam and has an IFD of 75 pounds at 25% compression. The polyurethane foam is commercially available for purchase as MOLECULON® from Reiss Industries, LLC of Watertown Wisconsin, a subsidiary of Reiss International, Ltd. The polyurethane foam properties are shown in Table 1 below.

TABLE 1

MOLECULON ®

GENERAL: This specification defines physical property requirements for molded flexible polyurethane foam produced by Reiss Industries, LLC. This foam is classified as High-Resilient. The test results provide a standard method of obtaining data for research and development, quality control, acceptance and rejection under specifications, and special purposes.

| PROPERTY | TEST METHOD | REQUIREMENT 55 High Resilient |
|---|---|---|
| Density of Test Block | ASTM D 3574 | 3.4 +/− 0.3 pcf min |
| Indentation Force Deflection | ASTM D 3574 | 75 lbs. +/− 8 lbs. |
| Indentation Load Ratio Support Factor | ASTM D 3574 | 2.5 Min |
| Resilience (Ball Rebound) | ASTM D 3574 | 50% Min |
| Compression Set: | ASTM D 3574 | |
| Dry aged @ 75% 22 hrs. 158° F. | | 10% Max |
| Humid aged @ 221° F. 3 hrs.- 75% 22 hrs. 158° F. 15% Max. | | 15% Max |
| Tensile Strength | ASTM D 3574 | 15.0 PSI |
| Elongation | ASTM D 3574 | 75% Min. |
| Tear Resistance | ASTM D 3574 | 1.0 PLI Min. |
| Flammability | Cal. Tech Info Bulletin No. 117 Sec. A, Part 1 (Vertical Burn) | MUST PASS |
| Flammability | Cal Tech Info Bulletin No. 117 Sec. D, Part 2 (Cigarette Resistance) | MUST PASS |
| Flammability | Federal Motor Vehicle #302 Max. 2.0"/Min. | MUST PASS |
| Flammability | California Tech Bulletin 117-2013 | MUST PASS |

The leg impart portion 140 of the seat back 114 includes expanded polyethylene (EPE) foam having a density between 1.0 and 1.6 pcf. In a preferred embodiment the density is 1.3 pcf for the EPE. Testing as will be discussed, failed at higher densities. The EPE is commercially available for purchase, for example as ARPAK®. A partial Material Physical Property Information for ARPAK® is shown in TABLE 2 below for the density range of 1.3 pcf to 1.9 pcf (20 to 30 g/l) although it can be purchased at densities up to 4.6 pcf (74 g/l) which are excluded from TABLE 2 below.

TABLE 2

| | | | ARPAK ®. | | |
|---|---|---|---|---|---|
| Physical Properties† | Test Method | Units | JSP ARPAK ® EPE | | |
| Density (Grade) | ASTM-D3575 | pcf | 1.3 | 1.5 | 1.9 |
| Density | ASTM-D3575 | g/l | 20 | 24 | 30 |
| Compressive Strength @ 10% | ASTM-D3575 | psi | 6.5 | 8.0 | 10.2 |
| Compressive Strength @ 25% | | psi | 8.8 | 10.3 | 12.8 |
| Compressive Strength @ 50% | | psi | 16.6 | 18.4 | 22.0 |
| Compressive Strength @ 75% | | psi | 42.5 | 47.6 | 55.6 |
| Tensile Strength | ASTM-D3575 | psi | 40 | 45 | 52 |
| Tensile Elongation | ASTM-D3575 | % | 38 | 35 | 32 |
| Tear Strength | ASTM-D3575 | lbs/in | 14 | 16 | 17 |
| Compressive Set @ 25% | ASTM-D3575 | % | 3 | 4 | 4 |
| Compressive Set @ 50% | ASTM D3575 | % | 14 | 13 | 12 |
| Buoyancy | ASTM-D3575 | lbs/ft$^3$ | 60.6 | 59.5 | 59.5 |
| Thermal Conductivity | ASTM-C177 | (K) BTU-in/ft$^2$-hr-° F. | 0.26 | 0.24 | 0.24 |
| Thermal Resistance | ASTM-C177 | (R) @70° F. | 4.0 | 4.2 | 4.2 |
| Coeff. of Lin. Thermal Expansion | ASTM-D696 | in/in/° F. × 10$^5$ | 8.2 | 7.2 | 6.2 |
| Service Temperature | ASTM-D3575 | ° F. (Max.) | 160 | 160 | 160 |
| Water Absorption | ASTM-D3575/C272 | % (vol)/lb/ft$^2$ | <5.0/<0.02 | <5.0/<0.02 | <5.0/<0.02 |

TABLE 2-continued

ARPAK ®.

| Physical Properties† | Test Method | Units | JSP ARPAK ® EPE | | |
|---|---|---|---|---|---|
| Compressive Creep | ASTM-D3575 | 1000 hr, % (psi) | 2.8 (1) | 3.0 (1) | 3.3 (1) |
| Flammability | FMVSS-302 | <4.0 in/min | Pass | Pass | Pass |
| Chemical Resistance | Various | 1 hr exposure (solvents, acids, and alkalines) | Pass | Pass | Pass |
| Fuel Immersion | Coast Guard; Fuel B per 33 CFR §183.114 | <5% (chg in vol) | Pass | Pass | Pass |

†Note:
For standard JSP ARPLANK ® EPE Products. Values shown are typical of the product and should not construed as specification limits. (NA = Not Available The leg impact portion 140 in a preferred embodiment is glued to head impact portion 138. Other attachment means can be used as readily understood by those skilled in the art, provided the attachment means result in compliance with the FMVSS provisions discussed above. So too, they can be manufactured as a single piece comprising the polyurethane foam of the head impact portion 138 and the EPE of the leg impact portion 140.

The head impact portion 138 is compliant with Federal Motor Vehicle Safety Standard Number 222 (FMVSS 222) for a contactable surface of a head protection zone. While the terms and definitions of FMVSS 222 are incorporated as if fully set forth herein as a matter a ready reference, FMVSS 222 at section S5.3.1.1 defines the head protection zones in each vehicle as the spaces in front of each school bus passenger seat which are not occupied by bus sidewall, window, or door structure and which, in relation to that seat and its seating reference point, are enclosed by the following planes; (a) Horizontal planes 305 mm and 1016 mm above the seating reference point; (b) A vertical longitudinal plane tangent to the inboard (aisle side) edge of the seat; and (c) A vertical longitudinal plane 83 mm inboard of the outboard edge of the seat; (d) Vertical transverse planes through and 762 mm forward of the reference point.

Figure 13:
FIG. 13 photograph of EPE 1.3 pcf leg protection zone testing results

A visualization of the "seat back contactable surface lying within head protection zone" is seen for example in FIG. 13 of the U.S. Department of Transportation National Highway Traffic Safety Administration Laboratory Test Procedure For FMVSS 222 School Bus Passenger Seating and Crash Protection TP-222-05, dated Oct. 21, 2011, which is incorporated as if fully set forth herein and hereafter referred to as TP-222-05.

S4 defines a contactable surface as "any surface within the zone specified in S5.3.1.1 that is contactable from any direction by the test device described in S6.6, except any surface on the front of a seat back or restraining barrier 76 mm or more below the top of the seat back or restraining barrier."

Still with respect to FIG. 4 and FIG. 5, the leg impact portion 140 is compliant with FMVSS 222 as a leg protection zone. The leg protection zone is defined at section S5.3.2 of FMVSS 222 as "Any part of the seat backs or restraining barriers in the vehicle within any zone specified in S5.3.2.1 and shall meet the requirements of S5.3.2.2 which states, "When any point on the rear surface of that part of a seat back or restraining barrier within any zone specified in S5.3.2.1 is impacted from any direction at 4.9 m/s by the knee form specified in S6.7, the resisting force of the impacted material shall not exceed 2,669 N and the contact area on the knee form surface shall not be less than 1,935 mm².""

S5.3.2.1 states, "The leg protection zones of each vehicle are those parts of the school bus passenger seat backs and restraining barriers bounded by horizontal planes 305 mm above and 102 mm below the seating reference point of the school bus passenger seat immediately behind the seat back or restraining barrier." A visualization of the regulatory defined "Leg Protection Zone" can be seen for example in FIG. 18 of TP-222-05.

The seating reference point SRP (also referred to as SgRP) is also explained in TP-222-05 as, "The unique design H-point, as defined in Society of Automotive Engineers (SAE) Recommended Practice J1100, revised June 1984, "Motor Vehicle Dimensions" (incorporated by reference, see § 571.5), which: (1) Establishes the rearmost normal design driving or riding position of each designated seating position, which includes consideration of all modes of adjustment, horizontal, vertical, and tilt, in a vehicle; (2) Has X, Y, and Z coordinates, as defined in Society of Automotive Engineers (SAE) Recommended Practice J1100, revised June 1984, "Motor Vehicle Dimensions" (incorporated by reference, see § 571.5), established relative to the designed vehicle structure; (3) Simulates the position of the pivot center of the human torso and thigh; and (4) Is the reference point employed to position the two-dimensional drafting template with the 95th percentile leg described in Society of Automotive Engineers (SAE) Standard J826, revised May 1987, "Devices for Use in Defining and Measuring Vehicle Seating Accommodation" (incorporated by reference, see § 571.5), or, if the drafting template with the 95th percentile leg cannot be positioned in the seating position, is located with the seat in its most rearward adjustment position. (571.3)."

The polyurethane of the head impact portion 138 defines an impact body 142 having a front face 144 facing away from a rear face 146, and in an embodiment a thickness 147 defined between the front face and the rear face between 1⅝ and 2 inches. The EPE of the leg impact portion 140 defines a knee body 148 having a third face 150 facing away from a fourth face 152 and a thickness 153 defined between the third face 150 and the fourth face 152 of between 2 and 2.5 inches.

Because the materials used to form the impact body 142 and the knee body 148 are fully comply with the flame retardant requirements of FMVSS 302, as well as the more stringent vertical burn/flammability testing, no flame retardant coating has to be sprayed over those materials. Further no other material, that is laminate or layer of material has to be placed between the cover 113 (FIG. 3) and the impact body 142 nor between the cover 113 (FIG. 3) and the knee body 148. The cover 113 (FIG. 3) covers the impact body 142 and the knee body 148. In other words, the impact body 142 and the knee body 148 are free of any flame retardant chemical coatings that are typically sprayed on the materials of seat backs to ensure compliance with FMVSS 302. This results in less chemical exposure to passengers and therefore increased safety for the passengers. This also results in less materials having to be used, and thus lower costs with the elimination of coatings and layers as the cover 113 (FIG. 3) is in direct contact with the impact body 142 and the knee body 148 without any other coating layers or material laminate layers therebetween.

As discussed previously, it is believed passengers seated in seats 104 with the seat backs 114 of the instant invention will be safer for longer than what current seat backs provide. Users, for example school districts providing school buses or contractors providing school bus services for school districts, should have a cost savings from having to change out or replace seats and seat backs so as to return them to compliance with FMVSS 222. Moreover, the passengers on the seats 104 with the seat back 114 of the physical properties of polyurethane and EPE and as arranged as discussed above should be safer than that heretofore known because they are compliant longer with FMVSS 222. The seat backs 114 absorb the energy of impact of the passengers longer than the seat backs heretofore known. This fully meets the purpose of FMVSS 222 to reduce the number of deaths and the severity of injuries that result from the impact of school bus occupants against structures within the vehicle during crashes and sudden driving structures.

Some of the comparison studies that support the belief that the seats 104 with the seat backs 114 of the instant invention comply longer with FMVSS 222 than prior art seats and seat backs are shown below in TABLE 3 and TABLE 4. TABLE 3 shows the results of the leg protection zone testing performed on the seat back 104 with seat back 114 pursuant to S5.3.2.2 of FMVSS 222. S5.3.2.2 states, "When any point on the rear surface of that part of a seat back or restraining barrier within any zone specified in S5.3.2.1 is impacted from any direction at 4.9 m/s [16 ftlb] by the knee form specified in S6.7, the resisting force of the impacted material shall not exceed 2,669 N [600 ftlb] and the contact area on the knee form surface shall not be less than 1,935 mm$^2$."

Seat back 114 was tested with leg impact portion 140 having the leg impact zone made up of EPE with a density of 1.3 pcf (see TABLE 2 for the EPE properties). Hit areas K3 see character reference 154, K6 (156) and, and K11 (158) (FIG. 4) were impacted at times A, B, C, D, and E as shown in TABLE 3.

Table 3 Leg Protection Zone Testing Results on Leg Impact Portion 140 of EPE 1.3. Test Area K3
  a. EPE failed testing at K3C at 606 lbs
  b. However there was no failure of the material
    i. May have simply shifted on the cushion resulting in this increased force
    ii. Passed 50% more impacts than EPS
Test Area K6
  a. EPE passed all testing through K6H
  b. EPE test values started to decline showing the values would not get any higher at 200% the cycles of the EPS failure
Test Area K11
  a. EPE passed all testing through K11E
  b. EPE test values started to decline showing the values would not get any higher
  c. Max values were 25% less than EPE

TABLE 3

| Knee Hit No. | Left/ Right | Velocity (Derived) [ft/s] | Resist Force [lbs] | Resist Force <600 [lbs] (pass/fail) | NOTES |
|---|---|---|---|---|---|
| K3A | wall | 16.00 | 535.1 | pass | N/A |
| K3B | wall | 15.60 | 593.4 | pass | same location. 2 hrs. after K3A |
| K3C | wall | 15.70 | 606.6 | fail | same location. 2 hrs. after K3B |
| K6A | wall | 16.30 | 471.9 | pass | N/A |
| K6B | wall | 16.20 | 495.6 | pass | same location. 2 hrs. after K6A |
| K6C | wall | 16.00 | 509.1 | pass | same location. 2 hrs. after K6B |
| K6D | wall | 15.67 | 520.8 | pass | same location. 30 mins. after K6C |
| K6E | wall | 17.60 | 518.1 | pass | same location. 30 mins. after K6D |
| K6F | wall | 15.60 | 534.3 | pass | same location. 2 mins. after K6E |
| K6G | wall | 15.59 | 542.3 | pass | same location. 2 mins. after K6F |
| K6H | wall | 15.30 | 541.3 | pass | same location. 2 mins. after K6G |
| K8A | wall | n/a | n/a | | N/A |
| K8B | wall | n/a | n/a | | N/A |
| K11A | wall | 15.72 | 406.3 | pass | N/A |
| K11B | wall | 16.10 | 437.5 | pass | same location. No wait time |
| K11C | wall | 14.50 | 440.3 | pass | same location. No wait time |
| K11D | wall | 15.35 | 443.6 | pass | same location. No wait time |
| K11E | wall | 15.70 | 442.0 | pass | same location. 30 mins after K11D |
| K12A | wall | n/a | n/a | | N/A |
| K12B | wall | n/a | n/a | | N/A |

EPE 1.3 leg protection zone
Work Order No.: 2210N sample 1
Knee Impacts

Figure 10:
FIG. 10 photograph of prior art leg protection zone testing.

TABLE 4 below shows the leg protection zone testing results of a prior art seat back having a leg protection zone made up of EPS (Expanded Polystyrene) Type II the properties of which are seen in TABLE 5 below.
Test Area K3
  a. First impact passed testing requirements of 600 lbs max
  b. Second impact failed requirements at 650 lbs
    i. EPS post test pictures (FIGS. 7-10) shows the EPS compression set from the first impact resulting in the failure on the second impact.
Test Area K6
  a. First three impacts passed testing requirements of 600 lbs max b. Fourth impact failed requirements of 600 lbs
      i. EPS post test pictures (FIG. 10) shows the EPS
         compression set from the first three impacts resulting
         in the failure on the fourth impact
      ii. Progressively higher impact numbers from test K6A
         through K6C support this conclusion.
      iii. Failure at K6D shows further compression set
Test Area K11
   a. Test area K11 shows fracture of the EPS, but still passed
      testing at a maximum impact after K11E of 560 lbs
   b. However this fracture would likely continue to degrade
      that impact area until catastrophic failure of the EPS
      material.

TABLE 4

| | | | | | |
|---|---|---|---|---|---|
| prior art EPS leg protect zone testing. Work Order No.: 2210N sample 2 Knee Impacts | | | | | |
| Knee Hit No. | Left/ Right | Velocity (Derived) [ft/s] | Resist Force [lbs] | Resist Force <600 [lbs](pass/fail) | NOTES |
| K3A | wall | 16.40 | 519.6 | pass | N/A |
| K3B | wall | 15.60 | 650.5 | fail | same location. 2 hrs. after K3A |
| K3C | wall | n/a | n/a | n/a | n/a |
| K6A | wall | 15.80 | 496.6 | pass | N/A |
| K6B | wall | 16.60 | 560.5 | pass | same location. 2 hrs. after K6A |
| K6C | wall | 17.50 | 586.1 | pass | same location. ~66 hrs. after K6B |
| K6D | wall | 16.60 | 624.2 | fail | same location 30 mins. after K6C |
| K6E | wall | n/a | n/a | n/a | N/A |
| K6F | wall | n/a | n/a | n/a | N/A |
| K6G | wall | n/a | n/a | n/a | N/A |
| K6H | wall | n/a | n/a | n/a | N/A |
| K8A | wall | n/a | n/a | | N/A |
| K8B | wall | n/a | n/a | | N/A |
| K11A | wall | 16.40 | 498.8 | pass | N/A |
| K11B | wall | 16.20 | 543.5 | pass | same location. No wait time |
| K11C | wall | 16.40 | 546.8 | pass | same location. No wait time |
| K11D | wall | 16.50 | 562.2 | pass | same location. No wait time |
| K11E | wall | 16.50 | 560.4 | pass | same location. 30 mins after K11D |
| K12A | wall | n/a | n/a | | N/A |
| K12B | wall | n/a | n/a | | N/A |

TABLE 5 prior art leg protection zone EPS Type II properties. The manufacturer's material data sheets advise the consumer that EPS is combustible and should not be exposed to flame or other ignition sources. EPS should be covered with a thermal barrier or otherwise installed in accordance with applicable building code requirements. As previously discussed this flammability is not present in the seat back 114 having EPE foam of 1.3 pcf. As discussed above, the knee body 148 of the instant application made up of EPE 1.3 pcf is fully compliant with the flame retardant requirement of FMVSS 302 without a thermal barrier or coating or layer unlike the prior art material of EPS. Additionally, the data sheets for EPS advise it is susceptible to damage by petroleum based solvents and their vapors and should be protected with vapor barrier covering and/or use compatible adhesives when applicable.

TABLE 5

| Physical U Physical Properties | | ASTM Test | Type II |
|---|---|---|---|
| Compressive Resistance at 10% Strain Deformation (2" cube) | Min psi (kPa) | D 1621, C 165 | 15.0 (104) |
| Flexural Strength | Min psi (kPa) | C 203 | 35.0 (240) |
| Thermal Resistance (R-Value)" 75 ± 2° F. (24 ± 1° C.) | Min R"for 1" thickness | C 177, C 518 | 4.17 (0.73) |
| 40 ± 2° F. (4.4 ± 1° C.) | | | 4.55 (0.77) |
| Thermal Conductivity (K-Value)' 75 ± 2 F. (24 ± 1° C.) | BTU/(hr) (Sq. Ft.) | C 177, C 518 | 0.240 (1.37) |
| 40 ± 2° F. (4.4 ± 1° C.) | (F./in.) | | 0.220 (1.26) |
| Coefficient of Thermal Expansion | In./(In.)(F.) | D 696 | 0.000035 |
| Moisture Resistance | % by volume | | 3.0 |
| Water Absorption by total immersion | Max | | |
| Water Vapor Permeability of 1" (25.4 mm) thickness max perm | Max perm/in (ng/Pa · s · m$^2$) | | 3.5 (201) |
| Oxygen Index | Min volume | % | 24.0 |
| Dimensional Stability (Change in dimensions) | Max % | | 2.0 |

TABLE 5-continued

| Physical U Physical Properties | | ASTM Test | Type II |
|---|---|---|---|
| Max. Service Temperature | | | |
| Long Term/Intermittent | F. | | 167/180 |
| Flame Spread | | | 5@4" |
| Smoke Developed | | | 2-235 |
| Density, minimum | Min lb/ft'(kg/m³) | | 1.35 (22) |
| Density, nominal | lb/ft' | | 1.50 |

Figure 11:
FIG. 11 photograph of EPE 1.3 pcf leg protection zone testing results.
Figure 12:
FIG. 12 photograph of EPE 1.3 pcf leg protection zone testing results.

As seen in comparing TABLE 3 and TABLE 4, the leg protection zone testing results show that the seat back 104 with leg protection zone 140 made up knee body 148 of EPE of 1.3 pcf having the properties, as shown in TABLE 2, of the instant invention (results shown in TABLE 3) outperformed the prior art seat backs (results shown in TABLE 4) having a seat back with a leg protection zone of EPS, having the properties as seen in TABLE 5. The EPS consistently showed poor performance in durability testing results of multiple impacts. This is due in part to the EPS material fracturing or taking a compression set as shown in the pictures of FIGS. 7-10 taken after the leg protection zone testing. This was not found with the EPE pcf 1.3 (properties TABLE 2) as seen in FIGS. 11 through 13. Repeated impacts made this condition worse which resulted in the EPS material not able to absorb the energy of the impact. This lack of absorbing the energy resulted in force readings above 600 lbs, which resulted in a failure of the EPS.

The leg protection zone testing results as shown in TABLE 3 show the knee body 148 of EPE of 1.3 pcf (properties TABLE 2) of the instant invention consistently showed superior performance characteristics in durability testing versus the EPS (TABLE 4 results, TABLE 5 properties) after multiple impacts. Throughout the test areas where the EPS material eventually failed testing, the EPE outperformed the EPS material by 50% to 200% better. In areas where the EPS material did not fail in this testing, the EPE material produced consistently 20% to 25% lower readings and a better benefit to the consumer with greater safety for the passenger utilizing the seats 104 with seat backs 148.

The test results show that the EPE material (TABLE 2) is a superior product over the EPS material (TABLE 5) in protecting the consumer/passenger as shown in test results of FMVSS 222. Additionally after repeated cycle testing of as little as a few impacts, the EPS fractured or took a compression set where the EPE material held its shape and its intended performance. The long term durability and ability of the EPE to protect the consumer for an extended period of time is significantly greater than that of the EPS. After use in the field, the EPE would better protect the consumer insuring their safety and protecting them better in the event of a crash from injury.

The overall assumptions that repeated testing of the EPS would result in fractured material and catastrophic failure is supported in these test results. Additionally, the EPS testing showed compression sets of the EPS material resulting in failure of the required maximum 600 lbs resistance force. These two conditions are representative of real world conditions and could result in failed testing in the field after little use by the consumer. The EPE material shows that it does not take a compression set and does not fracture or result in a catastrophic failure when repeatedly tested. Therefore the real world conditions of impact by the consumer would result in the EPE product continuing to pass testing. This would insure a highly engineered solution to the requirements of FMVSS 222 in real world applications.

In further support of the greater safety provided by the passenger seat 104 see the test results on the head impact portion 138 with the impact body 142 of polyurethane having a density between 3.1 and 3.7 pounds in a cubic foot (pcf) and an indentation force deflection (IFD) between 67 and 83 pounds at 25% compression, and more particularly 3.4 pcf and 75 pounds, with the properties as shown in TABLE 1. TABLES 6 and 7 below show the results of the head protection zone testing pursuant to FMVSS 222 sections S5.3.1.2, "head form impact requirement" and S5.3.1.3, "head form force distribution" conducted on both the "current foam," that is the foam of the prior art and the "new foam", that is the polyurethane foam of the head impact portion 138 having the properties shown in TABLE 1 above.

S5.3.1.1. states, "Any contactable surface of the vehicle within any zone specified in S5.3.1.1 shall meet the requirements of S5.3.1.2 and S5.3.1.3. However, a surface area that has been contacted pursuant to an impact test need not meet further requirements contained in S5.3."

S5.3.1.2 sets forth the head form impact requirements as, "When any contactable surface of the vehicle within the zones specified in S5.3.1.1 is impacted from any direction at 6.7 m/s by the head form described in S6.6, the axial acceleration at the center of gravity of the head form shall be such that the expression [1t1−t2∫ 1t2 adt] 2.5 (t1−t2) shall not exceed 1,000 where "a" is the axial acceleration expressed as a multiple of "g" (the acceleration due to gravity), and "t1" and "t2" are any two points in time during the impact.

Figure 6:
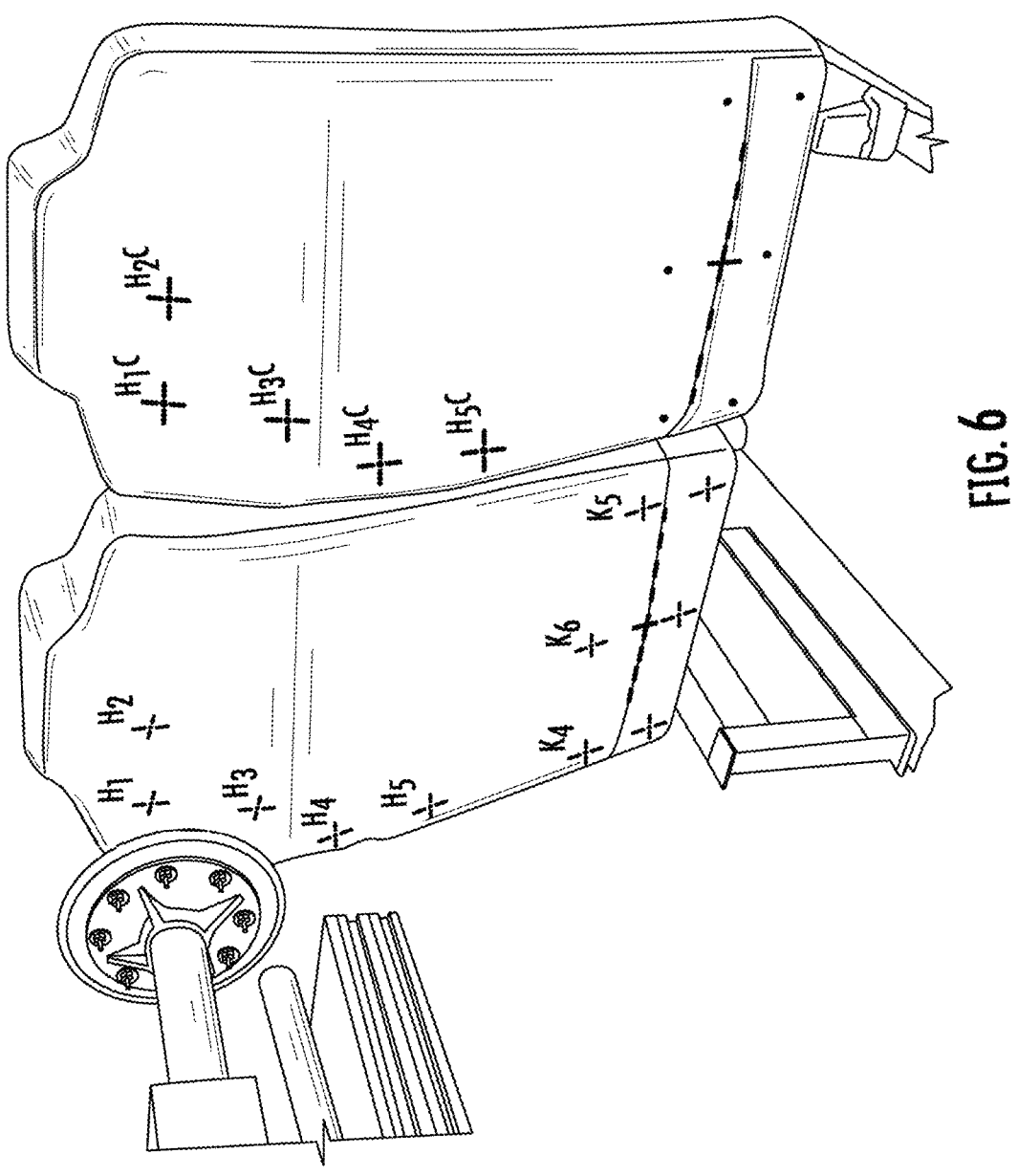
FIG. 6 illustrates another back view of one of the pair of passenger seats of FIG. 2 with targeted areas annotated for testing compliance with FMVSS 222.
Figure 7:
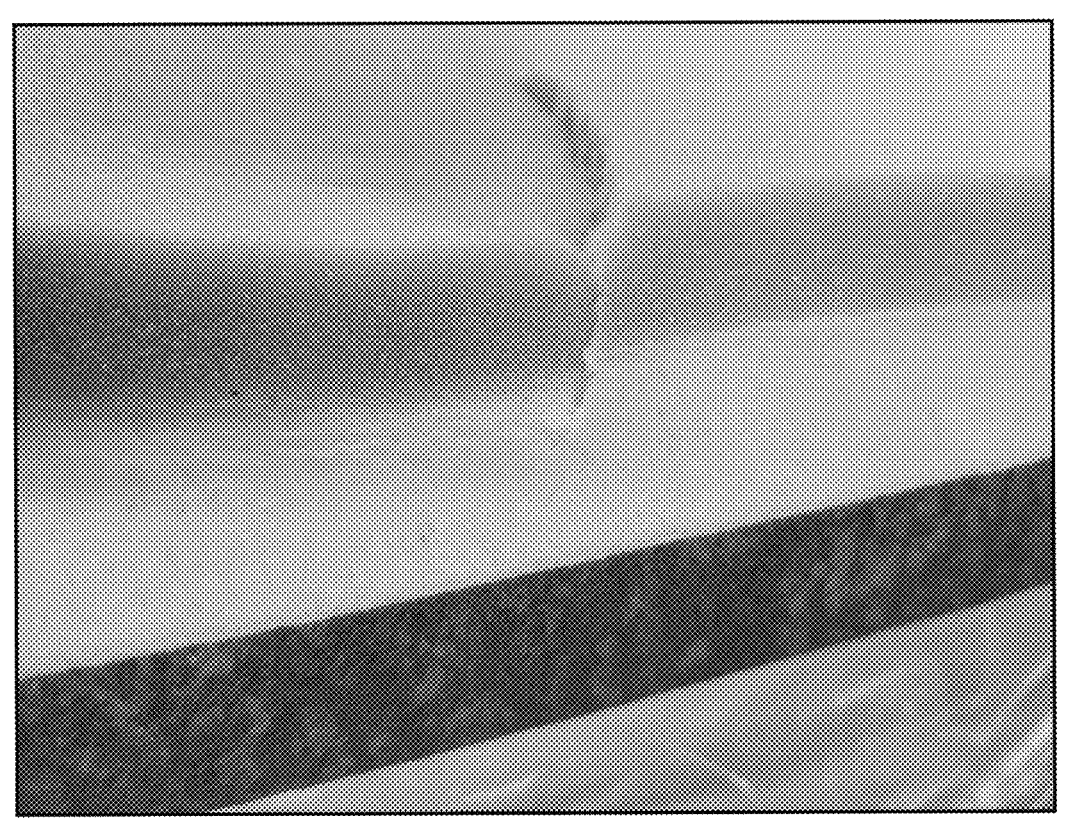
FIG. 7 photograph of prior art leg protection zone testing results.
Figure 8:
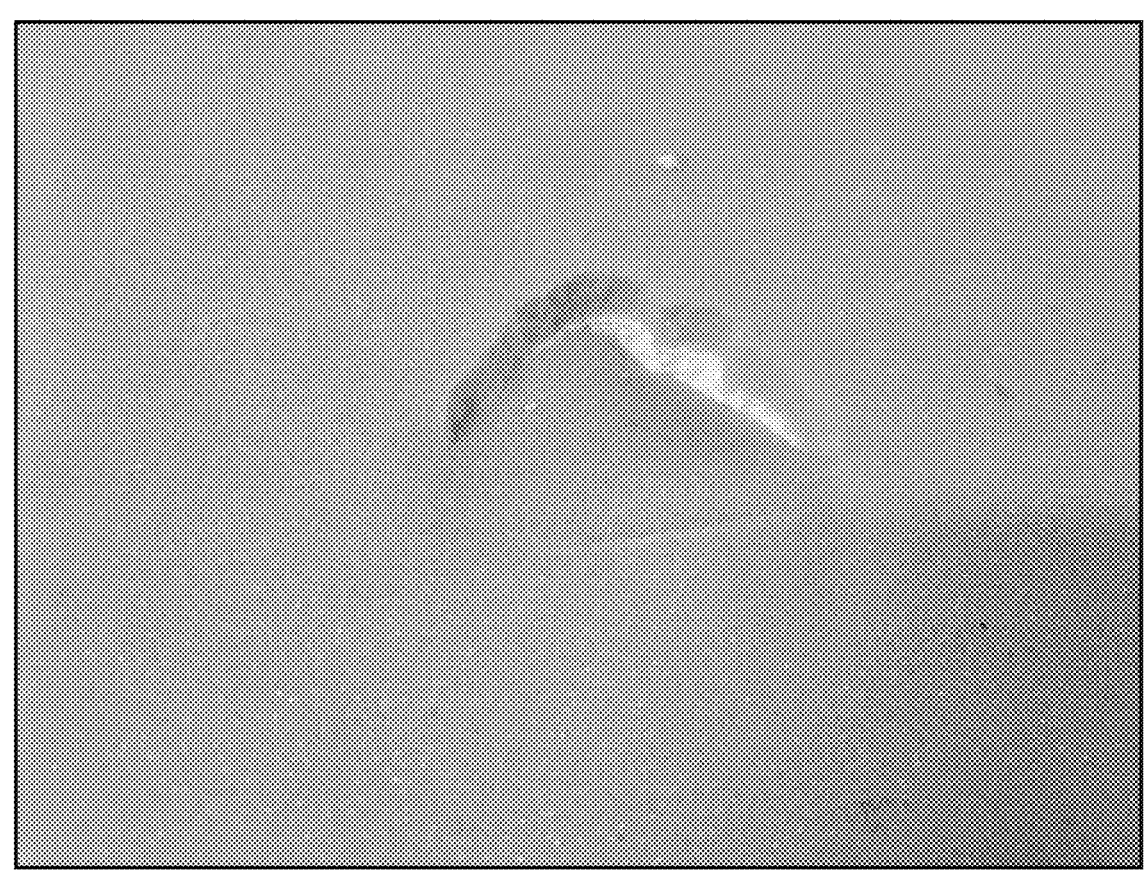
FIG. 8 photograph of prior art leg protection zone testing results.
Figure 9:
FIG. 9 photograph of prior art leg protection zone testing results.

TABLE 6 below shows the results of the testing done pursuant to S5.3.1.2 on both the "Current Foam," that is the foam of the prior art, and the "New Foam," that is the foam of TABLE 1. The H impact points are illustrated in FIG. 6. The prior art foam shown in TABLE 6 and TABLE 7 below as "Current Foam" is a combination of 2.2 pcf Polyethylene and 1.2 pcf polyurethane foam.

TABLE 6

| | | Energy, joules (>4.5 j) | | |
|---|---|---|---|---|
| | Head Impact No. | Current foam Average | New foam Average | % diff |
| Results for | H1 | 8.0 | 12.6 | 56.6 |
| FMVSS 222 | H2 | 8.1 | 8.0 | −2.1 |
| head impacts | H3 | 7.2 | 7.5 | 3.5 |
| | H4 | 6.9 | 10.3 | 48.2 |
| | | Overall average 26.6 | | |

S5.3.1.3 sets forth the requirements for the head form distribution, as, "when any contactable surface of the vehicle within the zones specified in S5.3.1.1 is impacted from any direction at 6.7 m/s by the head form described in S6.6, the energy necessary to deflect the impacted material shall be not less than 4.5 joules before the force level on the head form exceeds 667 N. When any contactable surface within such zones is impacted by the head form from any direction at 1.5 m/s the contact area on the head form surface shall be not less than 1,935 mm 2."

TABLE 7 shows the results of the testing done pursuant to S5.3.1.3 on both the "Current Foam," that is the foam of the prior art, and the "New Foam," that is the polyurethane foam of having the properties as shown in TABLE 1. The H impact points are illustrated in FIG. 6.

TABLE 7

| | | HIC, head injury criteria (max <1000) | | |
|---|---|---|---|---|
| | Head Impact No. | Current foam Average | New foam Average | % diff |
| Results for | H1 | 95.8 | 76 | −20.7 |
| FMVSS 222 | H2 | 134.7 | 86.8 | −35.6 |
| head impacts | H3 | 110.6 | 71.4 | −35.5 |
| | H4 | 88.5 | 64.3 | −27.4 |
| | | Overall average −29.8 | | |

The longevity of the molded polyurethane foam having the properties shown in TABLE 1 underwent 100,000 cycle durability testing with little degradation of physical properties. Because initial test results showed significantly better performance than current production (current foam), durability testing was not necessary. The prior art foam, "current foam" as noted above is a combination of 2.2 pcf Polyethylene and 1.2 pcf polyurethane foam. The molded polyurethane foam of TABLE 1 is much more consistent since it is molded and far superior in physical properties per the FMVSS 222 testing. Additionally, the cost is much less since the there is no complex fabrication of two materials as there is with the current design.

In light of the foregoing testing it is believed the seat 104 having seat backs 114 having the properties of the polyurethan foam of TABLE 1 at the head impact portion 138 and the EPE 1.3 pcf having the properties as seen in TABLE 2 are compliant for longer with the safety requirements of FMVSS 222 than has been hereto for known and are therefore safer for passengers. Moreover, the materials of TABLE 1 and TABLE 2 of the seat backs 114 are fully compliant with the flame retardant requirements of FMVSS 302 without having any chemical sprays, coatings or laminates therewith and thus are safer, because there is less possibility of chemical exposure to passengers, and more economical for manufacturers because less materials (chemicals) are used in production than those seat backs heretofore known.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A seat back of a seat for a multi-passenger vehicle, the seat back comprising:
   a head impact portion;
   a leg impact portion;
   wherein the head impact portion comprises polyurethane foam having a first density between 3.1 and 3.7 pounds in a cubic foot (pcf) and an indentation force deflection (IFD) between 67 and 83 pounds at 25% compression.

2. The seat back of claim 1, wherein the leg impact portion comprises expanded polyethylene (EPE) foam having a second density between 1.0 and 1.6 pcf.

3. The seat back of claim 2, wherein the second density is 1.3 pcf.

4. The seat back of claim 1, wherein the first density is 3.4 pcf and the IFD is 75 pounds at 25% compression.

5. The seat back of claim 1, wherein the multi-passenger vehicle is a bus and wherein the seat is a passenger seat.

6. The seat back of claim 5, wherein the head impact portion is compliant with Federal Motor Vehicle Safety Standard Number 222 (FMVSS 222) for a contactable surface of a head protection zone.

7. The seat back of claim 6, wherein the head impact portion defines an impact body having a first face facing away from a second face, and a first thickness defined between the first face and the second face between 1⅝ and 2 inches.

8. The seat back of claim 6, wherein the leg impact portion defines a knee body having a third face facing away from a fourth face and a second thickness defined between the third face and the fourth face between 2 and 2.5 inches.

9. The seat back of claim 5 wherein the leg impact portion is compliant with Federal Motor Vehicle Safety Standard Number 222 (FMVSS 222) as a leg protection zone.

10. The seat back of claim 1, wherein the seat back further comprises a cover covering the head impact portion and the leg impact portion.

11. The seat back of claim 10, wherein the cover contacts the polyurethane foam of the head impact portion and the cover contacts an EPE foam of the leg impact portion.

12. The seat back of claim 11, wherein the polyurethane foam of the head impact portion and the EPE foam of the leg impact portion are flame retardant, compliant with FMVSS 302, and are free of any flame retardant coating over their outermost surfaces.

13. A seat for a multi-passenger vehicle comprising:

a seat cushion mounted on a frame of the seat, a back cushion mounted to the frame, a seat back mounted on an opposite side of the frame, the back cushion and the seat back extending transversely away from the seat cushion, the seat back comprising:

a head impact portion;

a leg impact portion;

wherein the leg impact portion comprises expanded polyethylene (EPE) foam having a second density between 1.0 and 1.6 pcf; and wherein the head impact portion comprises polyurethane foam having a first density between 3.1 and 3.7 pcf and an indentation force deflection (IFD) of between 67 and 83 pounds at 25% compression.

14. The seat of claim 13, wherein the first density is 3.4 pdf and the IFD is 75 at 25% compression.

15. The seat of claim 13, wherein the wherein the second density is 1.3 pcf.

16. A method of manufacture of a seat for a multi-passenger vehicle, the method comprising the steps of:

attaching a seat back to a seat frame;

wherein the seat back comprises:

a head impact portion;

a leg impact portion;

wherein the head impact portion comprises polyurethane foam having a first density between 3.1 and 3.7 pounds in a cubic foot (pcf) and an indentation force deflection (IFD) of between 67 and 83 pounds at 25% compression.

17. The method of claim 16, further comprising the step of covering the seat back with a cover, the cover in contact with the polyurethane foam of the head impact portion and in contact with an EPE foam of the leg impact portion.

18. The seat back of claim 17, wherein the polyurethane foam of the head impact portion and the EPE foam of the leg impact portion are flame retardant, compliant with FMVSS 302, and are free of any flame retardant coating over their outermost surfaces.

19. The method of claim 16, wherein the head impact portion and the leg impact portions are compliant with Federal Motor Vehicle Safety Standard Number 222 (FMVSS 222) for a contactable surface of a head protection zone and a leg protection zone.

* * * * *